UNITED STATES PATENT OFFICE.

ALLEN MAY DUNN, OF OQUAWKA, ILLINOIS.

IMPROVEMENT IN REMEDIES FOR HOG-CHOLERA.

Specification forming part of Letters Patent No. 180,012, dated July 18, 1876; application filed June 6, 1876.

*To all whom it may concern:*

Be it known that I, ALLEN MAY DUNN, of Oquawka, in the county of Henderson and State of Illinois, have invented certain new and useful Improvements in Medicine for the Cure of Hog-Cholera, Chicken-Cholera, and Colic and Lung-Fever in Horses; and I do hereby declare that the following is a full, clear, and exact description thereof, which will enable others skilled in the art to which it appertains to make and use the same.

The nature of my invention consists in a medical compound for the cure of hog-cholera, chicken cholera, and colic and lung-fever in horses, as will be hereinafter more fully set forth.

My medical compound is composed of the following ingredients, in about the following proportions: Venetian red, two ounces; potash, one ounce; asafetida, one pound; sulphur, one pound; water, ten quarts. Six quarts of boiling water are added to the asafetida, and churned or stirred until thoroughly dissolved. The sulphur is added to four quarts of warm water, and stirred until thoroughly mixed. After being mixed, the Venetian red and potash are added and mixed again. The two compounds are then mixed together and strained, stirred, or churned, and bottled while warm. This mixture has then to undergo a process of fermentation, which takes from fifty to sixty days, and after which the compound is ready for use.

I do not confine myself to the exact proportions of the ingredients herein mentioned, as they may perhaps be varied according to circumstances.

Having thus fully described my invention, what I claim as new, and desire to secure by Letter Patent, is—

The within-described composition, consisting of Venetian red, potash, asafetida, sulphur, and water, in substantially the proportions described, and for the purpose specified.

In testimony that I claim the foregoing as my own invention I affix my signature in presence of two witnesses.

ALLEN MAY DUNN.

Witnesses:
H. F. MCALLISTER,
WM. C. RICE.